United States Patent [19]
Kays

[11] Patent Number: 5,483,294
[45] Date of Patent: Jan. 9, 1996

[54] COLOR TELEVISION SYSTEM WITH DEVICES FOR THE ENCODING AND DECODING OF COLOR TELEVISION SIGNALS REDUCING CROSS-LUMINANCE AND CROSS-COLOR

[75] Inventor: Rudiger Kays, Schwarzenbruck, Germany

[73] Assignee: Grundig E.M.V. Elektro-Mechanische Versuchsanstalt, Furth/Bay, Germany

[21] Appl. No.: 768,734

[22] PCT Filed: Apr. 11, 1990

[86] PCT No.: PCT/EP90/00575

§ 371 Date: Mar. 4, 1992

§ 102(e) Date: Mar. 4, 1992

[87] PCT Pub. No.: WO90/13210

PCT Pub. Date: Nov. 1, 1990

[30] Foreign Application Priority Data

Apr. 14, 1989 [DE] Germany .............. 39 12 323.5

[51] Int. Cl.[6] .................................................. H04N 11/14
[52] U.S. Cl. .................................... 348/609; 348/665
[58] Field of Search ................... 358/12, 23, 31, 358/16, 141; 348/609, 663, 665, 668, 669, 670; H04N 11/14, 9/78

[56] References Cited

U.S. PATENT DOCUMENTS

| | | | |
|---|---|---|---|
| 4,701,783 | 10/1987 | Glenn | 358/12 |
| 4,829,367 | 5/1989 | Dubois | 358/12 |
| 4,893,176 | 1/1990 | Faroudja | 358/31 |
| 4,949,166 | 8/1990 | Tsnardi | 358/31 |

FOREIGN PATENT DOCUMENTS

| | | | |
|---|---|---|---|
| 38 07 248.3 | 9/1989 | Germany . | |
| 0217789 | 9/1987 | Japan | H04N 11/140 |

OTHER PUBLICATIONS

Fernseh und Kinotechnik, vol. 39, No. 3, 1985, pp. 123–135.
Fernseh und Kinotechnik, vol. 42, No. 9, 1988, pp. 403–422.
Funkschau, No. 1, 1989, pp. 46–50.
Radio Mentor, vol. 12, 1969, pp. 847–851.

*Primary Examiner*—James J. Groody
*Assistant Examiner*—Chris Grant
*Attorney, Agent, or Firm*—Kane, Dalsimer, Sullivan, Kurucz, Levy, Eisele and Richard

[57] ABSTRACT

A color television system including an encoding device in which the chrominance and high-frequency luminance are sub-sampled in time. In the decoder, the high-frequency of the color television signal of the first and second fields are added thereby eliminating cross-luminance and the demodulated, low-frequency color difference signals are added thereby eliminating cross-color.

10 Claims, 5 Drawing Sheets

COLOR TELEVISION SYSTEM WITH DEVICES FOR THE ENCODING AND DECODING OF COLOR TELEVISION SIGNALS REDUCING CROSS-LUMINANCE AND CROSS-COLOR

BACKGROUND OF THE INVENTION

1. Field of the Invention

This invention pertains to a color television system including a device for the encoding of color television signals and a device for the decoding of color television signals. In the decoder, the high-frequency of the color television signal of the first and second fields are added thereby eliminating cross-luminance and the demodulated, lower frequency color difference signals are added thereby eliminating cross-color.

2. Description of the Prior Art

When color television was initially introduced, the luminance and chrominance signals were transmitted using the technique of frequency interlacing in order to ensure compatibility with previously existing television transmission systems and to facilitate transmission of the color information within the existing communication channels having a cutoff frequency of typically 5 megahertz. Although economical use of the channel width was indeed achieved with frequency interlacing, cross-talk interference occurs during decoding of the received television signals which sometimes significantly impairs the picture quality. Cross-talk from the luminance signal into the chrominance channel—this interference is referred to as cross-color—causes high-frequency horizontal luminance structures to suffer interference which appears as traveling red/green or blue/yellow wave patterns. Cross-talk from the chrominance signal into the luminance channel, called cross-luminance, appears as lines of achromatic dots in colored areas and along colored edges. Both types of cross-talk interference flicker in stationary images at a frequency of 6.25 Hz and 18.75 Hz.

To reduce this cross-talk interference, the magazine *Radio Mentor*, Volume 12, 1969, pages 847 through 851, published a description of a system for encoding of color television signals under the PAL standard, in which analog signal processing is performed using a disconnectable notch filter placed in the luminance channel. It is indeed possible to prevent the luminance component from being incorrectly evaluated on the receiving side as chrominance signals during demodulation of the chrominance subcarrier through the use of this notch filter. However, this technique involves a reduction of the horizontal resolution of the luminance signal to a value below 4 megahertz.

In the course of further development, digital signal processing techniques in the PAL encoder were investigated, in which the luminance and chrominance signals were subjected to comb filtering before combination. In the three-dimensional spectral representation of the image, comb filtering corresponds to a two or three-dimensional band separation which—with appropriate digital signal processing in the PAL decoder—can produce a picture with little cross-talk interference.

The magazine *Fernseh- und Kinotechnik*, Volume 39, Number 3, 1985, pages 123 through 135, described a PAL encoder and decoder in which a three-dimensional band limitation of luminance and chrominance signals is undertaken in such a way that the luminance and chrominance signals occupy different frequency ranges. This solution was further developed in the subject of the previously unpublished German patent application P38 07 248.3, in which separate three-dimensional filtering of the color difference signals permits transmission of each of these color difference signals with optimal resolution. In order to take into account the realities of the physiology of vision with regard to the color television standard, different pass bands in the filter were selected in this system for vertical spatial frequency and frame rate, for both color difference signals which are band-limited in the horizontal spatial frequency. For a color television signal conforming to the PAL standard, it is possible in this way to take into account that the human eye is significantly less sensitive to blurring of motion with respect to the color difference signal U than it is to blurring of motion with respect to the color difference signal V.

Additional solutions with three-dimensional filtering in the encoder and decoder are explained in detail in the magazine *Fernseh- und Kinotechnik,* Volume 42, Number 9, 1988, pages 403 through 422 and in the magazine Funkschau, No. 1, 1989, pages 46 through 50.

Common to all of the above-identified solutions is that great circuit complexity in the encoder and decoder is required in order to eliminate the cross-talk interference, which is associated with a loss in the resolution of details, i.e., reduced resolution for luminance and chrominance.

OBJECTS AND SUMMARY OF THE INVENTION

An object of this invention is to design a color television system such that it is possible to transmit, free of any cross-talk, high-frequency luminance and chrominance signals with relatively high resolution.

The color television pursuant to the invention is based on the fact that a temporal resolution of 12.5 hertz for the chrominance signal and the high frequency luminance signal (starting at approximately 3.5 megahertz, for instance), in other words, a frame repetition rate of 25 hertz, is adequate when the physiological aspects of vision are taken into account. In the case of film material, no greater temporal resolution is provided in any case. Especially for film material, the color television system pursuant to the invention makes it possible to transmit, free from any cross-talk, high-frequency luminance and chrominance signals with high resolution. The increased resolution can be attributed to the filtering required in the above-identified concepts for the vertical spatial frequency and frame rate can be omitted. The complexity of the circuitry required in the equipment for encoding and decoding is significantly reduced since only one field buffer each is required for the luminance signal and the two color difference signals. Any desired modulation process can be used with the color television system pursuant to the invention, and the invention is compatible with conventional color television receivers that use the PAL, NTSC or SECAM television standards. Moreover, the color television system pursuant to the invention has the advantage that a noise reduction of 3 db for chrominance signals and high frequency luminance signals is achieved in television receivers containing the decoding device.

An embodiment of this invention further includes three-dimensional filtering on the transmit and receive ends. In this way, aliasing errors (jerkiness of motion) can be avoided when electronically produced material is transmitted.

An embodiment of this invention includes three-dimensional filtering in the encoding device and/or in the decoding device which is disconnectable as a function of the frame repetition rate. Disconnection or switchover on the transmit side can be performed as a function of the material being transmitted, i.e., film material or electronically produced material. A motion detector which generates a control signal for switchover can be placed, for example, in the television receiver for determining the phase of motion of the first and second field, or the switchover is accomplished through a control signal generated on the transmit side that is sent, for example, in the data line of the television signal. The transmit-side control signal can be combined with other transmit-side control measures, such as a change in picture format or a switchover between different flicker reduction techniques, depending on whether film material or electronically produced material is being sent.

A further embodiment of this invention has the advantage that the cross-color interference in conventional color television receivers is reduced by the selected reduction factor.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
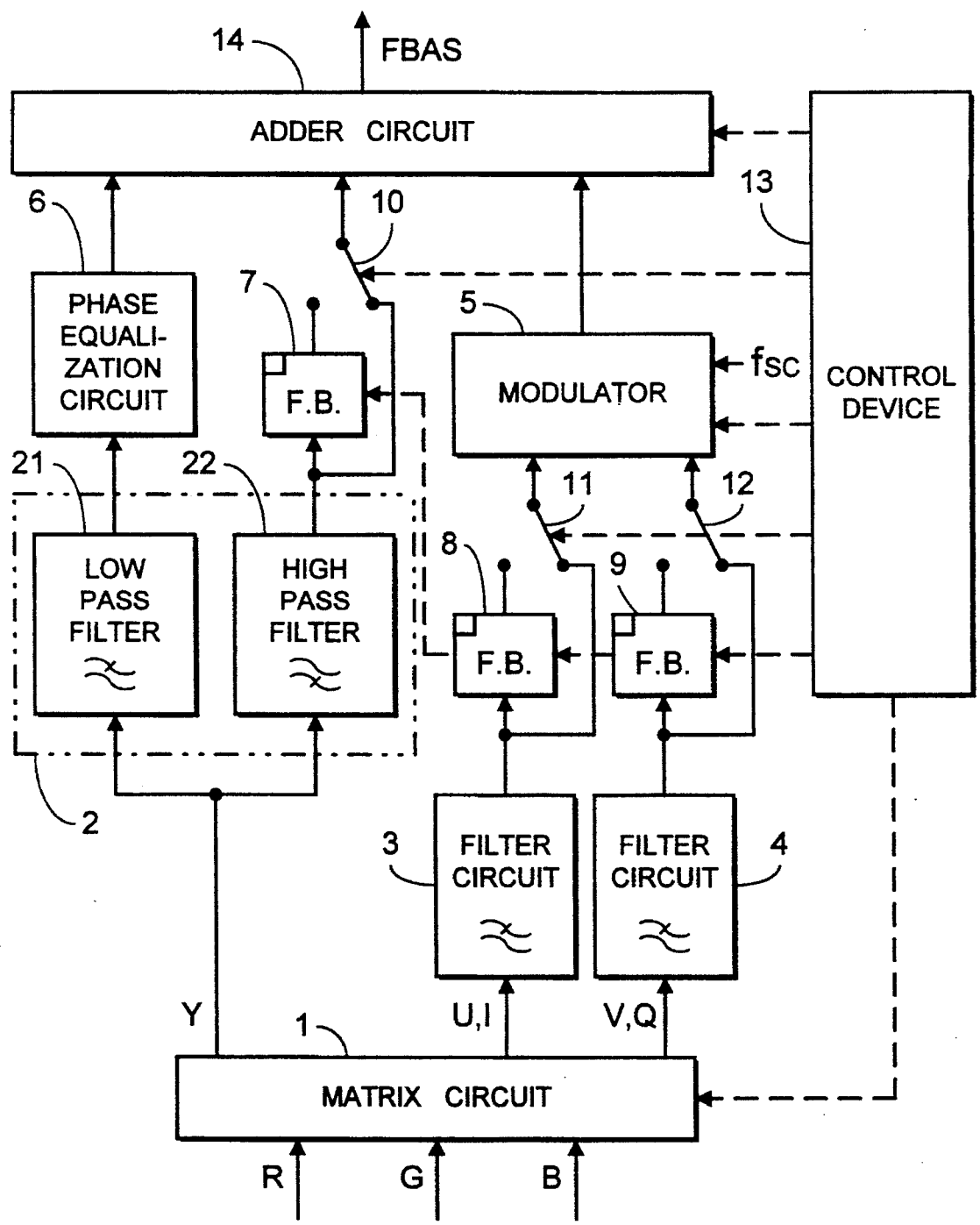
FIG. 1 is a schematic block diagram of an embodiment for encoding pursuant to the invention.

Referring now to the drawings in detail wherein like numerals refer to like elements throughout the several views, FIG. 1 is a schematic block diagram of an embodiment of the invention for encoding. This encoder includes a matrix circuit 1 for the conversion of RGB input signals into a luminance signal Y and at least two chrominance subcarrier signal U and V or I and Q; a filter circuit 2 and an associated phase equalization circuit 6 in the luminance channel; a filter circuit 3, 4 for the color difference signals U,V or I,Q; a modulator 5 for conversion of the color difference signals U,V or I,Q at the output of the filter circuit 3, 4 in a chrominance signal; and an adder circuit 14 for combining the luminance signal at the output of the phase equalization circuit 6 and the chrominance signal into the composite color television signal FBAS.

The encoder further includes temporal subsampling of the chrominance signal and nigh-luminance signal in such a way that the unmodulated color difference signals U,V or I,Q and the high-frequency luminance signal are each equal in the first and second fields. For this purpose, the high-frequency luminance signal and the color difference signals U,V or I,Q are fed to a field buffer 7, 8, 9 and a switching device 10, 11, 12, whose control input is connected to a control device 13 and whose other input is connected to the field buffer 7, 8, 9. The output of the switching device 10 is connected to the adder circuit 14 and the outputs of the switching devices 11 and 12 are each connected to the modulator 5.

The filter circuit 2 in the encoding device includes a low-pass filter 21, which is connected to the phase equalization circuit 6, and a high-pass filter 22. The read-in and read-out processes of the field buffer 7, 8, 9 and the switching process of the switching device 10, 11, 12 are controlled by the control device 13 by means of the control lines shown in the drawing as dashed lines.

Figure 2:
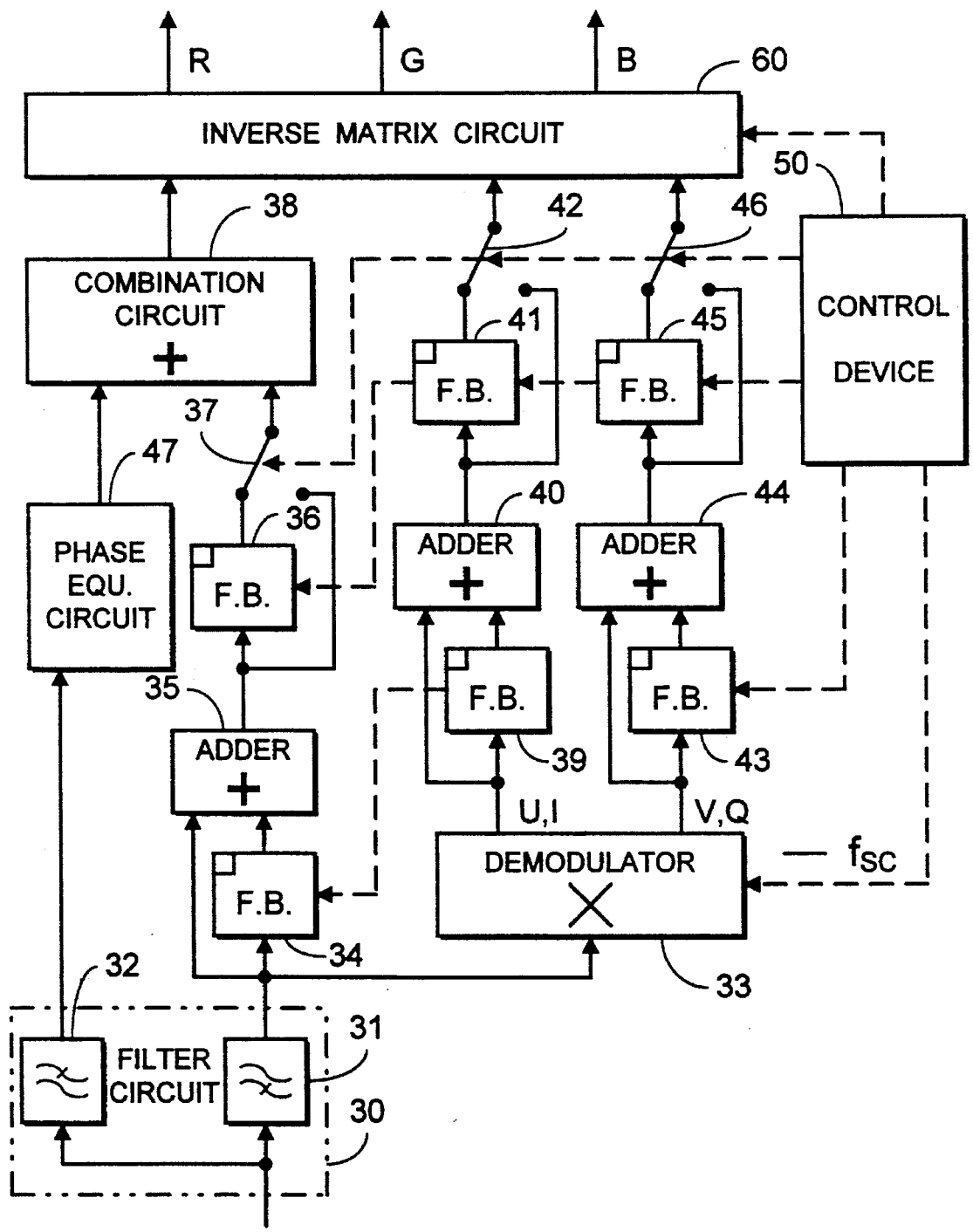
FIG. 2 is a schematic block diagram of an embodiment for decoding pursuant to the invention.

FIG. 2 illustrates the schematic block diagram of an embodiment of the device pursuant to the invention for decoding composite color television signals (FBAS). The decoder includes a filter circuit 30 for separating the FBAS composite color television signal into high-frequency and low-frequency signal portions (in other words, luminance/chrominance signal separation as is known in the prior art); a demodulator for converting the chrominance signal into two color difference signals U,V or I,Q; a phase equalization circuit 47 in the luminance channel and an inverse matrix circuit 60 for converting the luminance signal Y and the two color difference signals U,V or I,Q into RGB output signals.

Pursuant to this invention, the demodulated, lower frequency color difference signals U,V or I,Q received in the first and second fields are added together to eliminate cross-luminance and the high-frequency signal portions of the FBAS composite color television signal received in the first and second fields are also added together to eliminate cross-color. For this purpose, the high-frequency signal portions of the FBAS composite color television signal and the demodulated, low-frequency color difference signals U,V or I,Q are each fed to a separate field buffer 34, 39, 43. The output of the adder circuit 35, 40, 44 is connected to another field buffer 36, 41, 45 as well as to a switching device 37, 42, 46, whose control input is connected to a control device 50 and whose other input is connected to the second field buffer 36, 41, 45.

The filter circuit 30 in the decoding device includes a low-pass filter 32, which is connected to the phase equalization circuit 47, and a high-pass filter 31. The phase equalization circuit 47 is connected to a first input of combination circuit 38, whose output signal is fed to the inverse matrix circuit 60 and whose second input is connected to the output of the switching device 37 in the luminance channel. The output of the switching device 42 and 46 in the chrominance channel is connected to the inverse matrix circuit 60.

Figure 3:
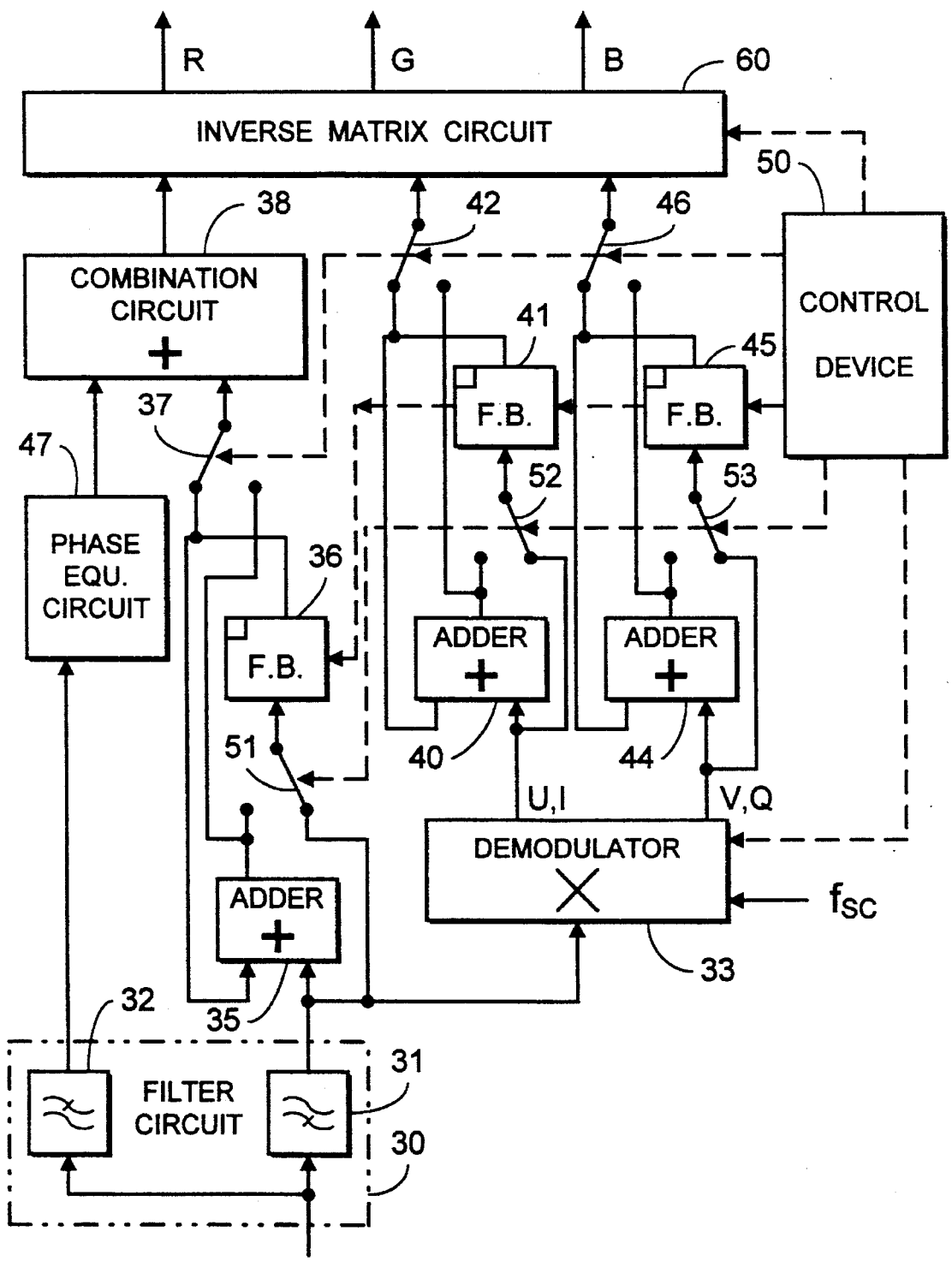
FIG. 3 is a schematic block diagram of a further embodiment for decoding pursuant to the invention.

In the second embodiment of the decoding device shown in FIG. 3, the buffer complexity has been reduced. To do so, the high-frequency signal portions of the FBAS composite color television signal and the demodulated lower frequency color difference signals U,V or I,Q are each fed to a first input of the adder circuit 35, 40, 44 and a first switching device 51, 52, 53. The output of the adder circuit 35, 40, 44 is connected to a first input of a second switching device 37, 42, 46, which corresponds to the second switching devices 37, 42, 46 shown in FIG. 2. A field buffer 36, 41, 45 (corresponding to FIG. 2) is connected to the output of the first switching device 51, 52, 53 and the output of the field buffer 36, 41, 45 is connected to a second input of the adder circuit 35, 40, 44 as well as to a second input of the second switching device 37, 42, 46. The inverse matrix circuit 60 is connected to the output of the second switching device 37, 42, 46 in the chrominance channel. The control signals for the read-in and read-out process and the switching process are fed to the field buffer 36, 41, 45 and the first and second switching device 51, 52, 53 and 37, 42, 46 through the control lines shown in the drawing as dashed lines.

Figure 5:
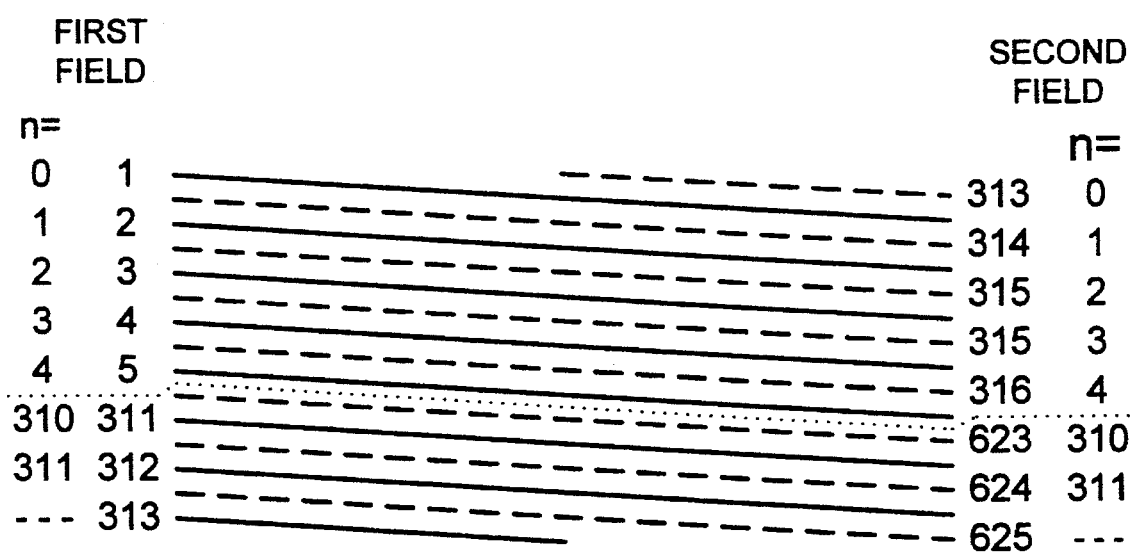
FIG. 5 shows schematically the line count to explain the definition of the chrominance subcarrier.

The mode of operation of the device for encoding and decoding of color televisions signals pursuant to the invention is described and explained in greater detail below, where the PAL color television system and the following simplifications and definitions are used as a basis:

1. Intraframe processing is done only once, so that the description on the XY level is sufficient. The signals are represented as a function of the location x and the line number n.
2. FIG. 5 shows the lines of a full frame. To simplify the description, the lines (in both the first and the second field) are given index numbers n, where:
   (a) the first line of the first field has the number n=0.
   (b) a line $n_1$ of the first field by one full frame line width d.
3. The following relationships hold for the chrominance subcarrier:

First field:

$f_{scu}(x,n)$ = $\sin(Y_x - n\pi/2)$
quarter line offset $f_{scv}(x,n)$ = $\cos(Y_x - n\pi/2) * (-1)^n = \cos(Y_x + n\pi/2)$
PAL Second field:

$f_{scu}(x,n)$ = $\sin(Y_x - n\pi/2 + \pi) = -\sin(Y_x - n\pi/2)$
field offset $f_{scv}(x,n)$ = $\cos(Y_x - n\pi/2 + \pi) = -\cos(Y_x + n\pi/2)$ In this consideration, the 25 hertz displacement of the chrominance subcarrier within a field is neglected, but the field offset is taken into account. This simplifies the representation and does not cause any troublesome computational errors as long as no filtering having extremely great filter length is undertaken with respect to vertical spatial frequency. This condition is usually met in practice.

After the matrix circuit 1, the signals y(x,n), u(x,n) and v(x,n) are present, i.e., $y_1$(x,n), $u_1$(x,n) and $v_1$(x,n) in the first field and $y_2$(x,n), $u_2$(x,n) and $v_2$(x,n) in the second field. The low frequency luminance components are passed through the low-pass filter 21 to the adder circuit 14. The cutoff frequency of the low-pass filter 21 is between 3 and 3.5 megahertz, which passes all components which do not overlap with the chrominance signal. For this reason, the cutoff frequency is related to the bandwidth of the filter circuit 3, 4. The high-pass filter 22 has a frequency response that is complementary to the low-pass filter 21. The high frequency luminance signal $y_{1H}$(x,n) can also be attenuated (factor $c_1$), in order to attain cross-color reduction in the compatible receiver (similar to the notch filtering that is common in some cases).

The arrangement of field buffer 7 and switching device 10 has the effect that the high-frequency luminance information in both fields is the same. In the first field $y_{1H}$(x,n) is fed to the adder circuit 14. The switching device 10 is in the position shown in FIG. 1.

While the second field is present, the switching device 10 is in the other position, which causes the signal delayed by $T_0$ to be passed on. For the PAL standard, $t_0$=312×64 μs should be chosen, so that $y_{1H}$(x,n) is again present at the output.

The same arrangement of field buffer and switching device is also used in the chrominance channel. At the input to modulator 5, the signal $u_1$(x,n) or $v_1$(x,n) is again present in both the first and second frames.

After modulation, one obtains in accordance with the above description the chrominance subcarrier:

in the first field:

$u_1(x,n)*\sin(Y_x-n\pi/2)*v_1(x,n)*\cos(Y_x+n\pi/2)$ in the second field:

$-u_1(x,n)*\sin(Y_x-n\pi/2)*v_1(x,n)*\cos(Y_x+n\pi/2)$

If one designates the low-pass components of the luminance as $y_T$(x,n) and the high-pass components as $Y_H$(x,n), one obtains as the composite color television signal on the transmission channel:

First field:

$f_1(x,n)=y_{T1}(x,n)+c_1Y_{H1}(x,n)+ u_1(x,n)*\sin(Y_x-n\pi/2)+ v_1(x,n)*\cos(Y_x+n\pi/2)$ Second field:

$f_2(x,n)=y_{T2}(x,n)+c_1Y_{H1}(x,n)- u_1(x,n)*\sin(Y_x-n\pi/2)- v_1(x,n)8\cos(Y_x+n\pi/2)$ In all, one field buffer each is required for $Y_H$, U and V, where one temporal subsampling is accomplished for the chrominance signal and the high-frequency luminance signal in the device for encoding.

In principle, then, the danger of temporal aliasing errors (jerking as in film in movie theaters) exists. It is Dot anticipated that this will cause any impairment to quality. If necessary, temporal pre-filtering could be performed in a more complex device for encoding before subsampling is done.

For decoding in the luminance channel, the low-pass filter 32 again separate the low-frequency luminance portions, which are fed through the phase equalization circuit 47 to the combination circuit 38. The phase delay in the decoder is approximately 20 milliseconds, corresponding to the duration of one field.

High-pass filter 31 which is complementary to low-pass filter 32 supplies at its output a composite signal of high-frequency luminance and modulated chrominance.

The luminance separation of the high-frequency luminance portions is now performed through the circuit arrangement of adder circuit 35, field buffer 36 and the switching devices 37, 51 of FIG. 3. A corresponding circuit arrangement is also used in the chrominance channel.

While the first field is being supplied, both switching devices 37, 51 are in the position shown in FIG. 3. Thus the signal of the first field is present at the input of the field buffer 36. The field buffer 36 is now controlled such that, before a storage location is written to, the old buffer content is first read out. In this case, the information from the previous frame, namely the sum of the two fields, is still stored there. This information is fed to the combination circuit 38, weighted with a factor $c_2$=0.5$c_1$ if necessary.

If the second field is present, a switchover occurs. Then the sum of information from the first field and the second field is present at the output of the adder circuit 35.

Figure 4:
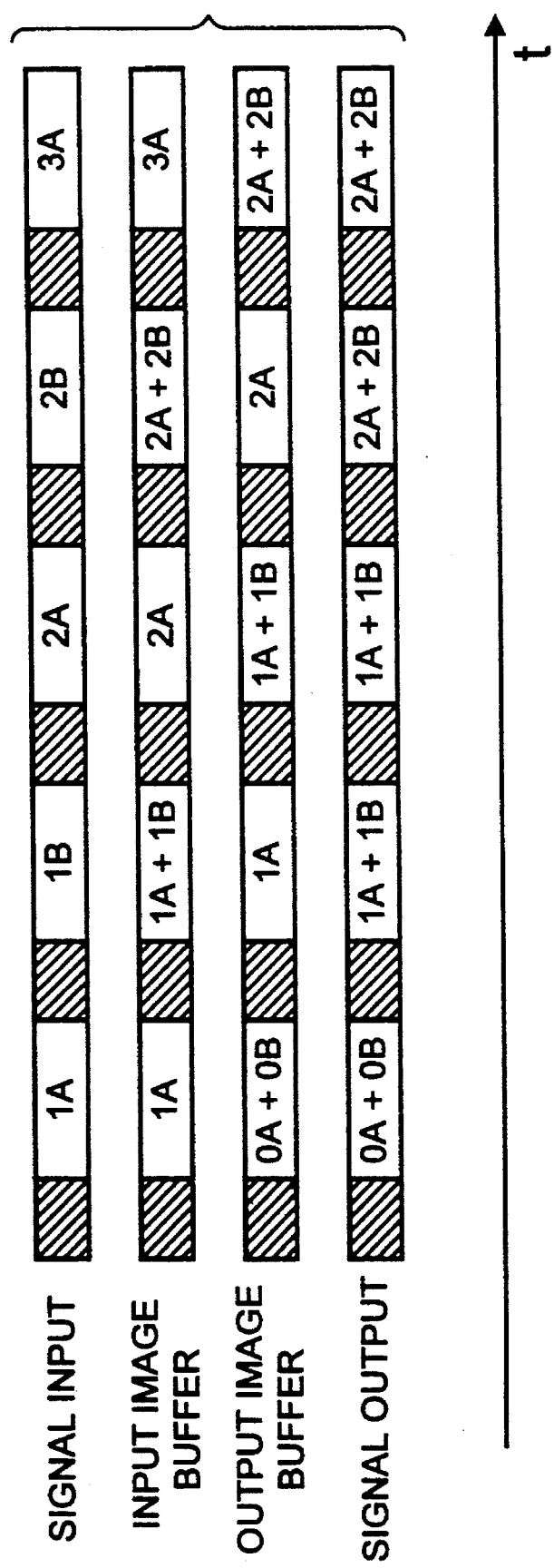
FIG. 4 illustrates the buffer utilization scheme for the embodiment of FIG. 3.

During the first field of the subsequent frame, this summed information is read out again. The arrangement thus delays the signal by 20 milliseconds. This mode of operation is also illustrated in FIG. 4 (buffer utilization scheme).

At the output of the arrangement, one accordingly always obtains the sum of the information of two associated fields:

$$\begin{aligned} Y_H'(x,n) &= c_1 * Y_{H1}(x,n) + u_1(x,n) * \sin(Y_x - n\pi/2) + \\ &\quad v_1(x,n) * \cos(Y_x + n\pi/2) + c_1 * Y_{H1}(x,n) - \\ &\quad u_1(x,n) * \sin(Y_x - n\pi/2) - v_1(x,n) * \cos(Y_x + n\pi/2) \\ &= 2c_1 * Y_{H1}(x,n) \end{aligned}$$

The summed signal $Y_H'(x,n)$ is free of cross-color interference. Amplitude weighting with the factor $c_2 = 0.5c_1$ is still needed. Through the addition, noise reduction of 3 dB occurs. For this reason, it is acceptable to decrease the high-frequency luminance portions with $c_1 < 1$ in the transmitter, in order to offer a cross-color reduction to the compatible receiver.

For color decoding, the high-frequency portions of the composite color television signal are next fed to the demodulator 33, which multiplies the signal with the reconstructed chrominance subcarriers and performs low-pass filtering:

$$\begin{aligned} u'(x,n) &= \{c_1 * Y_{H1}(x,n) * \sin(Y_x - n\pi/2) + \\ &\quad u_1(x,n) * \sin^2(Y_x - n\pi/2) + v_1(x,n) * \sin(Y_x - \\ &\quad n\pi/2) * \cos(Y_x + n\pi/2)\}_{TP} \\ &= c_1 * Y_{H1}(x,n) * \sin(Y_x - n\pi/2) + 1/2 u_1(x,n) \end{aligned}$$

The doubled chrominance subcarrier frequency thus generated - in accordance with $\cos(2Y_x - n\pi)$ or $\sin(2Y_x)$—is suppressed by the low-pass filter.

$$\begin{aligned} u'(x,n) &= \{-c_1 * Y_{H1}(x,n) * \sin(Y_x - n\pi/2) + \\ &\quad u_1(x,n) * \sin^2(Y_x - n\pi/2) + v_1(x,n) * \sin(Y_x - \\ &\quad n\pi/2) * \cos(Y_x + n\pi/2)\}_{TP} \\ &= -c_1 * Y_{H1}(x,n) * \sin(Y_x - n\pi/2) + 1/2 u_1(x,n) \end{aligned}$$

Through addition of the two field segments:

$$u'(x,n) = u'(x,n)$$

One thus obtains U components free of any cross-luminance interference. The same procedures must also be carried out for the V components. The decoded signals can then be fed to the inverse matrix circuit 60.

As the above description shows, any desired modulation process (quadrature modulation, frequency modulation) can be used in the color television system pursuant to the invention and transmission of high-frequency luminance and chrominance signals with high resolution that is completely free of cross-talk (in the case of film material) is facilitated with circuitry of low complexity.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

I claim:

1. A color television system comprising a coding device for coding color television signals having first and second fields, the coding device comprising:

a matrix for converting RGB input signals into a luminance signal and at least two color difference signals;

a first low pass filter and a delay equalizing circuit connected thereto for generating a low frequency luminance signal from said luminance signal;

a first high pass filter for generating a high frequency luminance signal from said luminance signal;

a second low pass filter for filtering the color difference signals;

a modulator for converting the color difference signals at an output of the second low pass filter into a chrominance signal; and a combining circuit for combining the low frequency luminance signal, high frequency luminance signal and the chrominance signal to form a color television signal, the color television signal having high frequency signal components containing both said high frequency luminance signal and said chrominance signal and low frequency component containing said low frequency luminance signal;

the system further comprising a decoding device for decoding said color television signal, the decoding device comprising;

a filter circuit for separating the color television signal into said high frequency and said low frequency signal components;

a demodulator for converting the chrominance signal of the high frequency signal components into at least two lower frequency color difference signals;

a second delay equalizing circuit coupled to the filter circuit for receiving the low frequency luminance signal of the low frequency signal component;

a second combining circuit for combining the low frequency luminance signal of the low frequency signal component and the high frequency luminance signal of the high frequency signal components to form a new luminance signal; and an inverse matrix circuit means for converting the new luminance signal and the at least two lower frequency color difference signals into RGB signals;

wherein the coding device carries out a temporal subsampling of the chrominance signal and the high frequency luminance signal whereby the unmodulated color difference signals and the high frequency luminance signal are identical for the first and second field by repeating, and wherein the decoding device adds the high frequency signal components of the color television signal for eliminating cross-luminance of the received first and second field, and adds the demodulated lower frequency color difference signals for eliminating cross-color of the received first and second field.

2. The color television system of claim 1 wherein said high-frequency luminance signal and said color difference signals are each fed to a field buffer and a switching means in said coding device, wherein a control input of said switching means is connected to a control means and wherein another input of said switching means is connected to said field buffer.

3. The color television system of claim 1 wherein said filter circuit in said decoding device further includes a high-pass filter means and further includes a low-pass filter means which is connected to the second delay equalizing circuit.

4. The color television system of claim 1 wherein said decoding device includes a PAL decoder.

5. The color television system of claim 1 wherein said coding device includes a PAL encoder.

6. The color television system of claim 1 wherein a motion detector for determining the phase of motion of the first and second field generates a control signal for switchover between the coding device and an PAL-encoder.

7. The color television system of claim 6 wherein a control signal generated on the coding side is detected on the decoding side.

8. A color television system comprising a coding device for coding color television signals having first and second fields, the coding device comprising:
a matrix for converting RGB input signals into a luminance signal and at least two color difference signals;
a first low pass filter and a delay equalizing circuit connected thereto for generating a low frequency luminance signal from said luminance signal;
a first high pass filter for generating a high frequency luminance signal from said luminance signal;
a second low pass filter for filtering the color difference signals;
a modulator for converting the color difference signals at an output of the second low pass filter into a chrominance signal; and
a combining circuit for combining the low frequency luminance signal, high frequency luminance signal and the chrominance signal to form a color television signal, the color television signal having high frequency signal components containing both said high frequency luminance signal and said chrominance signal and low frequency component containing said low frequency luminance signal;

the system further comprising a decoding device for decoding said color television signal, the decoding device comprising;
a filter circuit for separating the color television signal into said high frequency and said low frequency signal components;
a demodulator for converting the chrominance signal of the high frequency signal components into at least two lower frequency color difference signals;
a second delay equalizing circuit coupled to the filter circuit for receiving the low frequency luminance signal of the low frequency signal component;
a second combining circuit for combining the low frequency luminance signal of the low frequency signal component and the high frequency luminance signal of the high frequency signal components to form a new luminance signal; and
an inverse matrix circuit means for converting the new luminance signal and the at least two lower frequency color difference signals into RGB signals;

wherein the coding device carries out a temporal subsampling of the chrominance signal and the high frequency luminance signal whereby the unmodulated color difference signals and the high frequency luminance signal are identical for the first and second field by repeating, and wherein the decoding device adds the high frequency signal components of the color television signal for eliminating cross-luminance of the received first and second field, and adds the demodulated lower frequency color difference signals for eliminating cross-color of the received first and second field;

wherein said high frequency luminance signal of said high-frequency signal components of said color television signal and said at least two lower frequency color difference signals from said demodulator each are fed in said decoding device to a first field buffer and an initial input of an adder circuit, wherein a second input of said adder circuit is connected to an output of said first field buffer, and an output of said adder circuit is connected to a second field buffer and to a switching means, wherein a control input of said switching means is connected to a control means and wherein another input of said switching means is connected to said second field buffer.

9. The color television system of claim 8 wherein said second delay equalization circuit is connected to a first input of said second combining circuit, wherein an output of said second combining circuit is fed to said inverse matrix circuit means and wherein a second input of said second combining circuit is connected to an output of said switching means in a luminance channel of said high frequency luminance signal.

10. A color television system comprising a coding device for coding color television signals having first and second fields, the coding device comprising:
a matrix for converting RGB input signals into a luminance signal and at least two color difference signals;
a first low pass filter and a delay equalizing circuit connected thereto for generating a low frequency luminance signal from said luminance signal;
a first high pass filter for generating a high frequency luminance signal from said luminance signal;
a second low pass filter for filtering the color difference signals;
a modulator for converting the color difference signals at an output of the second low pass filter into a chrominance signal; and
a combining circuit for combining the low frequency luminance signal, high frequency luminance signal and the chrominance signal to form a color television signal, the color television signal having high frequency signal components containing both said high frequency luminance signal and said chrominance signal and low frequency component containing said low frequency luminance signal;

the system further comprising a decoding device for decoding said color television signal, the decoding device comprising;
a filter circuit for separating the color television signal into said high frequency and said low frequency signal components;
a demodulator for converting the chrominance signal of the high frequency signal components into at least two lower frequency color difference signals;
a second delay equalizing circuit coupled to the filter circuit for receiving the low frequency luminance signal of the low frequency signal component;
a second combining circuit for combining the low frequency luminance signal of the low frequency signal component and the high frequency luminance signal of the high frequency signal components to form a new luminance signal; and
an inverse matrix circuit means for converting the new luminance signal and the at least two lower frequency color difference signals into RGB signals;

wherein the coding device carries out a temporal subsampling of the chrominance signal and the high frequency luminance signal whereby the unmodulated color difference signals and the high frequency luminance signal are identical for the first and second field by repeating, and wherein the decoding device adds the high frequency signal components of the color television signal for eliminating cross-luminance of the received first and second field, and adds the demodulated lower frequency color difference signals for eliminating cross-color of the received first and second field;

wherein portions of said color television signal and said at least two lower frequency color difference signals from said demodulator in said decoding device each are fed to a first input of an adder circuit and to a first switching means, wherein an output of said adder circuit is connected to a first input of a second switching means, wherein a field buffer is connected to an output of said first switching means and an output of said field buffer is connected to a second input of said adder circuit and to a second input of said second switching means.

* * * * *